Dec. 14, 1948.   W. E. CAMPAIGNE   2,456,373
RUBBER FLOORING
Filed Sept. 11, 1942

Inventor
William E. Campaigne

Attorney

Patented Dec. 14, 1948

2,456,373

UNITED STATES PATENT OFFICE 2,456,373

RUBBER FLOORING

William E. Campaigne, Akron, Ohio, assignor to Wingfoot Corporation, Akron, Ohio, a corporation of Delaware Application September 11, 1942, Serial No. 457,945

1 Claim. (Cl. 175—264)

This invention relates to rubber flooring, and, more particularly, to rubber flooring especially designed to minimize the build-up of static electricity during the use of such flooring.

Rubber flooring is, of course, in wide use and has outstanding wearing and cushioning characteristics. Certain disadvantages have heretofore been encountered in special applications, however. For example, in some places the build-up of static electricity during use of the flooring creates a serious explosion hazard. This hazard exists in plants where explosives are manufactured and it has also been suggested that serious consequences may take place in hospital operating rooms where nurses and doctors build up static by walking and then touch a patient whose lungs are full of an explosive anaesthetic mixture. The principal object of the present invention is to provide a rubber flooring which will minimize the build-up of static electricity and the attendant hazards in particular installations.

Figure 1:
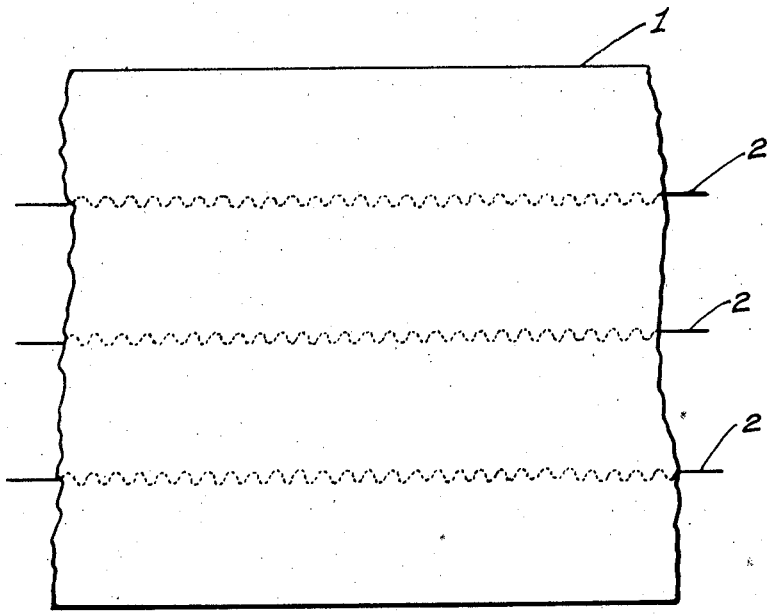
Figure 2:

In the attached drawing, Figs. 1 and 2 are plan and elevation, respectively, of an illustrative form of the invention.

Referring to the drawing, 1 is a body of rubber flooring which may be suitably compounded in accordance with standard practices to provide proper wearing, ageing and other characteristics. In addition, however, this rubber is preferably compounded so as to give it relatively high electrical conductivity. Various means for doing this are well known. For example, certain species of carbon black, powdered metals and other compounding ingredients may be added to lessen the resistivity of the rubber. Running through the rubber flooring is a series of linear metal elements 2. These elements are spaced approximately parallel to each other and to the plane of the flooring. In practice, a spacing of about one foot has been found to be satisfactory but, if desired, somewhat narrower or wider spacings may also be employed. The metal elements 2 are so constructed that they are readily extensible and compressible in the direction of their length. This feature is important from several standpoints. It is obvious that these metal elements will lose their efficacy as electrical conductors if they are broken, and there are several places in the manufacturing process where breakage is likely to occur. One convenient method for incorporating the metal elements into the flooring is to lay them between sheets of rubber in a calendering operation, the metal elements running in the direction of calender travel, with considerable pressure on the calender rolls to force the components of the flooring into a unitary structure. The force on the calender rolls causes a "pull-down" on the advancing strip which exerts a strong stretching force on the metal elements. After the web leaves the calender, some of this stretching is relieved by recovery of the stock. Later, in the vulcanization, with the attendant heating and cooling, there are further expansion and contraction forces involved. By providing a readily stretchable and compressible metal element, strains developed in the manufacturing process (and possibly later in use) are minimized and actual breakage is avoided.

The metal elements 2 may take various forms. A preferred form is a flat crimped, single wire. When this form is used, the flat crimped wire is laid in the flooring so that the plane of the crimp is substantially parallel to the plane of the flooring. This avoids exposure of the wire at either of the surfaces of the flooring, which exposure would, of course, cause undue wear and possible breakage of the wire.

Other metal conductive elements which are readily stretchable and retractable in the direction of their length may also be used. Thus, multi-strand woven cables of the specified characteristics may also be employed.

In installing the flooring, it is desirable to ground the ends of the metal elements. In some cases, it may be necessary to strip back and even cut away edge portions of the flooring. The use of flat crimped wire is particularly advantageous in this respect, since the ends of the wires may readily be pulled out from the flooring to provide the necessary connections.

I claim:

Electrically conductive rubber flooring material which is adapted to be grounded for the dissipation of static electrical charges created on the surface of the material comprising a vulcanized rubber compound having enhanced electroconductive properties and embedded in the rubber a plurality of spaced mutually parallel extensible electroconductive elements extending in the same general direction therein and without interconnection therebetween within the body of the material, said elements being of continuous undulated form with said undulations lying in a common plane substantially parallel to the surfaces of the flooring facilitating adjustment of said elements on expansion and contraction of the material and enabling the interconnection of the several elements with a ground exteriorly of the material.

WILLIAM E. CAMPAIGNE.

(References on following page)

REFERENCES CITED

The following references are of record in the file of this patent:

UNITED STATES PATENTS

| Number | Name | Date |
|---|---|---|
| 1,505,272 | Mart | Aug. 19, 1924 |
| 1,577,050 | Weigel | Mar. 16, 1926 |
| 1,616,950 | Burdette | Feb. 8, 1927 |
| 1,797,545 | Churcher | Mar. 24, 1931 |
| 1,978,041 | Dodge | Oct. 23, 1934 |
| 2,184,811 | Freer et al. | Dec. 26, 1939 |
| 2,244,557 | Iknayan | June 3, 1941 |
| 2,287,766 | Davis | June 30, 1942 |
| 2,325,414 | McChesney | July 27, 1943 |

FOREIGN PATENTS

| Number | Country | Date |
|---|---|---|
| 316,201 | Great Britain | July 25, 1929 |